(12) United States Patent
Becker

(10) Patent No.: US 8,253,264 B2
(45) Date of Patent: Aug. 28, 2012

(54) ORBITING DRUM WIND TURBINE AND METHOD FOR THE GENERATION OF ELECTRICAL POWER FROM WIND ENERGY

(76) Inventor: Erwin Martin Becker, Noerten-Hardenberg (DE)

( * ) Notice: Subject to any disclaimer, the term of this patent is extended or adjusted under 35 U.S.C. 154(b) by 0 days.

(21) Appl. No.: 13/027,234

(22) Filed: Feb. 14, 2011

(65) Prior Publication Data
US 2011/0198857 A1   Aug. 18, 2011

(30) Foreign Application Priority Data
Feb. 16, 2010   (DE) .................. 10 2010 008 061

(51) Int. Cl.
*F03B 13/00*   (2006.01)
*H02P 9/04*   (2006.01)
*F03D 9/00*   (2006.01)

(52) U.S. Cl. ................. 290/54; 290/44; 290/55
(58) Field of Classification Search ............. 290/44, 290/54, 55
See application file for complete search history.

(56) References Cited

U.S. PATENT DOCUMENTS

| | | | | |
|---|---|---|---|---|
| 1,449,426 A * | 3/1923 | Loveless et al. | .................. | 415/5 |
| 1,568,718 A * | 1/1926 | Brattland | ........................ | 415/4.1 |
| RE18,122 E | 7/1931 | Flettner | ............................ | 244/10 |
| 3,504,988 A * | 4/1970 | Stenner | ............................. | 416/9 |
| 3,630,470 A * | 12/1971 | Elliott | .............................. | 244/21 |
| 3,730,643 A * | 5/1973 | Davison | ............................. | 416/8 |
| 3,992,125 A * | 11/1976 | Schilling | .......................... | 415/5 |
| 4,048,947 A * | 9/1977 | Sicard | ............................... | 440/8 |
| 4,134,469 A * | 1/1979 | Davis | ............................. | 180/2.2 |
| 4,186,314 A * | 1/1980 | Diggs | .............................. | 290/55 |
| 4,366,386 A | 12/1982 | Hanson | ........................... | 290/44 |
| 4,446,379 A * | 5/1984 | Borg et al. | ....................... | 290/55 |
| 4,494,008 A | 1/1985 | Patton | .............................. | 290/44 |
| 4,527,950 A * | 7/1985 | Biscomb | ........................ | 416/117 |
| 4,582,013 A | 4/1986 | Holland, Jr. | .................. | 114/39.3 |
| 4,589,344 A * | 5/1986 | Davison | ........................... | 104/24 |
| 4,832,569 A * | 5/1989 | Samuelsen et al. | ............. | 416/17 |
| 5,134,305 A * | 7/1992 | Senehi | ............................. | 290/55 |
| 5,744,871 A * | 4/1998 | Robles Akesolo | .............. | 290/55 |
| 5,758,911 A | 6/1998 | Gerhardt | ......................... | 290/55 |
| 6,375,424 B1 * | 4/2002 | Scarpa | ............................. | 416/4 |
| 6,672,522 B2 | 1/2004 | Lee et al. | ........................ | 290/55 |
| 6,747,370 B2 * | 6/2004 | Abe | ................................. | 307/66 |

(Continued)

FOREIGN PATENT DOCUMENTS

CA   1117022   1/1982

(Continued)

*Primary Examiner* — Pedro J Cuevas
(74) *Attorney, Agent, or Firm* — Frederick T. Varcoe, Jr.

(57) ABSTRACT

A wind turbine captures energy from a flowing fluid medium using drum-shaped drive elements that spin while traveling along a continuous orbiting course around a base. Attached roller bearings engaging stationary raceways can guide the drive elements. Means for spinning the drive elements can include toothed belts engaging drive element cog wheels. Spinning can provide Magnus effect enhancement. Wind energy is captured by the drive element motion, then transferred to the base cog wheels by a toothed belt and finally fed to an output shaft. The invention includes locating drive elements in a moving fluid medium, spinning the drive elements as they are urged by the wind along a continuous orbiting course and capturing energy by linking the motion of the drive elements to an external device. The method includes adjusting the base's azimuth and the angle of incidence of the wind in response to wind direction and speed.

21 Claims, 10 Drawing Sheets

U.S. PATENT DOCUMENTS

| | | | | |
|---|---|---|---|---|
| 6,809,430 B2* | 10/2004 | Diederich | | 290/54 |
| 7,075,191 B2 | 7/2006 | Davison | | 290/54 |
| 7,075,192 B2* | 7/2006 | Bywaters et al. | | 290/55 |
| 7,109,600 B1* | 9/2006 | Bywaters et al. | | 290/55 |
| 7,119,453 B2* | 10/2006 | Bywaters et al. | | 290/55 |
| 7,183,665 B2* | 2/2007 | Bywaters et al. | | 290/55 |
| 7,504,740 B2 | 3/2009 | Murakami et al. | | 290/55 |
| 7,615,883 B2* | 11/2009 | Meheen | | 290/55 |
| 7,633,178 B1 | 12/2009 | Embree | | 290/55 |
| 7,673,415 B2* | 3/2010 | Wan | | 47/20.1 |
| 7,709,971 B2 | 5/2010 | Sane et al. | | 290/43 |
| 7,714,457 B2* | 5/2010 | Sankrithi | | 290/44 |
| 7,750,491 B2* | 7/2010 | Sankrithi | | 290/55 |
| 7,781,905 B2* | 8/2010 | Newman | | 290/54 |
| 7,862,290 B2* | 1/2011 | Diederich | | 415/5 |
| 7,902,684 B2* | 3/2011 | Davison et al. | | 290/44 |
| 7,986,054 B2* | 7/2011 | Douglas | | 290/54 |
| 7,989,973 B2* | 8/2011 | Birkestrand | | 290/44 |
| 8,174,135 B1* | 5/2012 | Roe et al. | | 290/44 |
| 2001/0043013 A1* | 11/2001 | Abe | | 307/66 |
| 2005/0230979 A1* | 10/2005 | Bywaters et al. | | 290/44 |
| 2006/0137348 A1* | 6/2006 | Pas | | 60/641.1 |
| 2006/0152015 A1* | 7/2006 | Bywaters et al. | | 290/55 |
| 2006/0152016 A1* | 7/2006 | Bywaters et al. | | 290/55 |
| 2007/0046029 A1* | 3/2007 | Murakami et al. | | 290/55 |
| 2007/0099745 A1* | 5/2007 | Fox | | 475/331 |
| 2007/0114797 A1* | 5/2007 | Krug et al. | | 290/44 |
| 2007/0127858 A1* | 6/2007 | Nakagawa et al. | | 384/495 |
| 2007/0211976 A1* | 9/2007 | Fox et al. | | 384/494 |
| 2008/0048455 A1* | 2/2008 | Carney | | 290/54 |
| 2008/0148723 A1* | 6/2008 | Birkestrand | | 60/327 |
| 2008/0196758 A1* | 8/2008 | McGuire | | 136/245 |
| 2009/0058091 A1* | 3/2009 | Douglas | | 290/53 |
| 2009/0121484 A1 | 5/2009 | Newman | | 290/44 |
| 2009/0127861 A1* | 5/2009 | Sankrithi | | 290/54 |
| 2009/0127862 A1* | 5/2009 | Sankrithi | | 290/55 |
| 2009/0174192 A1 | 7/2009 | Newman | | 290/55 |
| 2009/0241820 A1* | 10/2009 | Rohden | | 114/39.3 |
| 2009/0278353 A1* | 11/2009 | Da Costa Duarte Pardal et al. | | 290/44 |
| 2009/0311924 A1* | 12/2009 | Wobben | | 440/6 |
| 2010/0013238 A1* | 1/2010 | Jessie et al. | | 290/55 |
| 2010/0034649 A1* | 2/2010 | Taylor | | 415/208.1 |
| 2010/0038915 A1 | 2/2010 | Murakami | | 290/55 |
| 2010/0090469 A1* | 4/2010 | Sullivan | | 290/55 |
| 2010/0187829 A1* | 7/2010 | Douglas | | 290/55 |
| 2011/0001323 A1* | 1/2011 | Douglas et al. | | 290/1 R |
| 2011/0006534 A1* | 1/2011 | Achard et al. | | 290/54 |
| 2011/0215586 A1* | 9/2011 | Grace | | 290/55 |
| 2012/0142235 A1* | 6/2012 | Wobben | | 440/6 |

FOREIGN PATENT DOCUMENTS

DE 102008044686 A1 * 3/2010
JP 2003274554 A * 9/2003

* cited by examiner

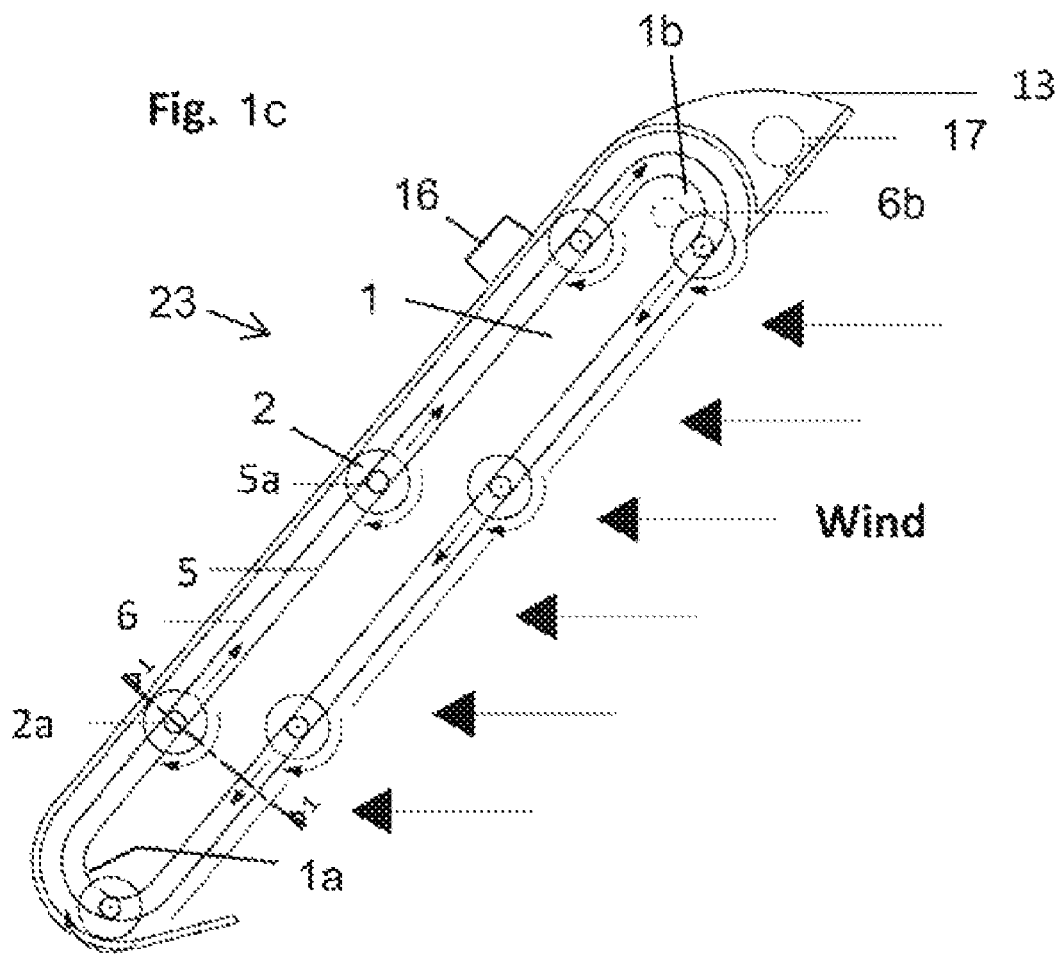

ORBITING DRUM WIND TURBINE AND METHOD FOR THE GENERATION OF ELECTRICAL POWER FROM WIND ENERGY

CROSS-REFERENCE TO RELATED APPLICATIONS

This application claims priority to German Patent Application DE 10 2010 008 061.6 filed on Feb. 16, 2010, and incorporated herein by reference in its entirety.

BACKGROUND OF THE INVENTION

The present invention is related to extracting power from moving fluids such as wind and water. Application examples include, but are not limited to, powering water pumps, process machinery and prime-mover dynamo plants having an integrated or external dynamo driven by a fluid current motor.

The supply of oil, natural gas, or coal, as resources for generation of energy is eventually limited, and will be too expensive to use for this purpose in the foreseeable future. In addition, the detrimental consequences of the combustion of oil, gas, and coal for the environment are sufficiently known.

The invention is designed to contribute to the protection of the environment, by using wind energy.

Wind turbines with a horizontal axis and a three-blade rotor have mostly outcompeted other known systems. However, these wind turbines also have disadvantages: if operated in the vicinity of populated areas, inhabitants are harassed by noise and shadows cast. In addition, equipment losses due to bird strikes have been reported. Modern wind turbines are under continuous demand for ever higher capacity. Higher capacity is achieved by extending the length of the rotor blades. Accordingly, the support tower has to be extended in length. The enlarged blades have more weight and a larger radius. This also strongly increases the centrifugal force. Correspondingly, the statics of the blade and load capacity of the pitch control have to be modified. A particular hazard for large wind power plants is lightning strikes. Cases are known where despite lightning protection systems, rotor blades have been struck by lightning and were destroyed. In other cases, the electric control was destroyed by lightning, or fire has destroyed the entire plant.

The highest degree of efficiency is achieved with a slender profile of the rotor blade. However, slenderness of profile in very large rotor blades is limited by statics. It is known that due to differences in wind speed, resonance oscillations may build up and lead to material fatigue. In the worst case, this can lead to physical contact of the blades with the tower and rupture of the blade. In addition, the passing of the blade at the tower creates objectionable noise and can, with both windward and leeward rotors, lead to resonance oscillations.

Wind turbine systems already exist that use sails, paddles, or blades that run in a continuous loop over chains, ropes, or belts, over two or four wheels. In these systems, sails, paddles, or blades are impinged with wind, setting the system to motion. In the Canadian patent specification CA 111 702 2 by Cocjin, a machine is shown in which wind paddles run in a chain drive orbiting around a base plate. Every wind paddle is additionally carried by two trolleys, which are orbiting supported by two u-shaped guide rails. The paddles run upwards impinged by the wind, and return protected from the wind by the shielding. Cojin's system has many disadvantages compared with the orbiting drum wind turbine of the present invention. One disadvantage is the chain drive. Additionally, the Magnus-Effect is not applicable in the context of Cocjin's construction principle. It is general knowledge that chains undergo material extension, create operational noise, and need extensive care. Moreover, Cocjin's machine cannot adjust to different wind velocities, because it lacks run control. As a consequence, the machine has to be shut off at higher wind velocities.

BRIEF SUMMARY OF THE INVENTION

It is therefore an object of the invention to provide an orbiting drum turbine with drums in an extremely compact design, and with a considerably reduced susceptibility to failure that can be produced and operated inexpensively and with a high degree of efficiency.

The machine proposed here is based on a simple principle: Place a pencil on a sheet of paper on a desk and blow on it from random angles, and at varying strength. The invention comprises transferring the thus created rolling motion demonstrated by the pencil example to a continuous loop, and using it to generate energy. In comparison, the three-blade rotor of a conventional wind turbine with a diameter of 80 m renders the same power output as 20 drum turbines with a length of 6 m. The drums, or drive elements, are driven by both impact pressure and by the Magnus effect. The Magnus effect, achieved partially as a result of fluid passing a spinning drum, potentially provides significant enhancement of the efficiency of the system. According to Prof. Ludwig Prandtl of the University of Göttingen, the Magnus-Effect renders up to ten times more uplift than an airfoil.

Briefly stated, a wind turbine captures energy from a flowing fluid medium using drum-shaped drive elements that spin while traveling along an orbiting course on a base. Attached roller bearings engaging stationary raceways can guide the drive elements. Means for spinning the drive elements can include toothed belts engaging drive element cog wheels. Spinning can provide Magnus effect enhancement. Wind energy is captured by the drive element motion, then transferred to the base cog wheels by a toothed belt and finally fed to an output shaft. The invention includes locating drive elements in a moving fluid medium, spinning the drive elements as they are urged by the wind along a continuous orbiting course and capturing energy by linking the motion of the drive elements to an external device. The method includes adjusting the base's azimuth and the angle of incidence of the wind in response to wind direction and speed.

According to one embodiment of the invention, an orbiting drum turbine for capturing energy from a flowing fluid medium such as wind or water includes a base and at least one flow-driven, drum-shaped drive element having a central axis, which is guided around the base in an orbiting course while maintaining essentially the same angle between the drive element central axis and an intersecting horizontal plane. If more than one drive element is present, all such elements will therefore maintain their central axes parallel to each other as they move together around the orbiting course. The driving flow of the fluid medium moves the drive element which transfers energy from the fluid medium to other parts of the invention and eventually to an energy output element. Examples of an energy output element include, but are not limited to, a rotating shaft or a hydraulic pump. The embodiment has means for guiding the drive element in the orbiting course so that the drive elements follow the orbiting course when a flowing fluid medium impinges on them, as well as means for spinning the drive elements about their central axes as they follow the orbiting course. The drive elements engage in motion comprising simultaneously spinning and travelling along the orbiting course.

According to another embodiment, the invention includes a stator winding mounted on the base and an armature winding mounted on the drive element, positioned so as to induce an electric current by the motion of the drive element.

According to still another embodiment of the invention, the means for guiding the drive elements in the orbiting course includes at least one roller bearing attached to the drive element and at least one bearing raceway on the base. The raceway guides the bearing and the attached drive element in the orbiting course.

According to still another embodiment of the invention, an orbiting drum wind turbine for capturing energy from a flowing fluid medium spins the drive element as it follows the orbiting course using a movable flexible drive member, for example a toothed belt or a chain such as a double-roller chain, that engages at least one drive element drive wheel mounted on the drive element. There is also a stationary drive surface in contact with the drive element drive wheel and mounted on the base. The stationary surface is designed to grip the surface of the drive element wheel, permitting the drive element wheel to roll along over the stationary surface but preventing the drive element wheel from slipping on the stationary surface. The stationary drive surface can be a gear rack that mates with a drive element cog wheel.

According to yet another embodiment of the invention, an orbiting drum wind turbine for capturing energy from a flowing fluid medium has at least one base drive wheel rotatably supported by the base. That base drive wheel engages a movable flexible drive member and receives energy from the movable flexible drive member.

According to another embodiment of the invention, an orbiting drum wind turbine for capturing energy from a flowing fluid medium transfers energy from a base drive wheel to an output shaft rotatably connected to the base drive wheel. The energy can then be transferred to an external dynamo by one of various means, including but not limited to, a geared transmission, or an hydraulic system.

Another embodiment of the invention comprises at least one drum-shaped drive element having a reinforcing spiral-shaped corrugated outer layer. This is so that as the drive element spins, any Magnus effect present will be enhanced.

According to another embodiment of the invention, an orbiting drum wind turbine for capturing energy from a flowing fluid medium has support, a rotary crane mounted on the support for following the direction of flow of the fluid medium, a forked crown mounted on the rotary crane and a swing carrier mounted in the forked crown. The swing carrier supports the base. The base can be pivoted from the swing carrier in the forked crown, thereby varying the attitude of the base to match the flow speed of the fluid medium. At low flow speeds the base is tilted toward the vertical to present a larger profile to the fluid medium. At higher flow speeds, the base is tilted to a flatter configuration, thereby presenting a small profile to the flowing medium. This is so that during high flow speed conditions the apparatus can be throttled by tilting to maximize performance by varying the angle of incidence of the fluid medium on the base.

According to another embodiment of the invention, an orbiting drum wind turbine for capturing energy from a flowing fluid medium has solar power cells installed on the turbine, along with tracking automation and operational control that serve, during a calm, to position the turbine so as to optimize performance of the cells based on the position of the sun. The tracking control adjusts the position of the solar cells on the turbine by adjusting the pivot angle of the base at the swing carrier and adjusting the azimuth controlled by the rotary crane.

According to still another embodiment of the invention, an orbiting drum wind turbine for capturing energy from a flowing fluid medium has a support located on a mast. The turbine can be raised and lowered on the support mast using at least one cable.

According to yet another embodiment of the invention, an orbiting drum wind turbine for capturing energy from a flowing fluid medium has at least one drum-shaped drive element a base, a roller bearing attached to an end of the drive element, and a raceway on the base. The roller bearing engages the raceway, thereby guiding the drive element around the orbiting course which extends around the base. The central axes of the drive elements are maintained at essentially the same angle with an intersecting horizontal plane as the drive elements move around their orbiting course. The drive elements spin as they follow the orbiting course. That spinning is brought about by at least one movable toothed belt along with at least one drive element cog wheel mounted on an end of the drive element. The drive element cog wheel engages the belt. There is also at least one base cog wheel engaging the belt and receiving the mechanical energy from it. The turbine is configured so that when a flowing fluid medium such as wind impinges on the drive element, the drive element simultaneously spins and travels along the continuous orbiting course, thus capturing energy from the impinging fluid medium and transferring the energy to at least one base cog wheel via the belt.

According to still another embodiment of the invention, an orbiting drum wind turbine for capturing energy from a flowing fluid medium has a rotary crane mounted on a support for following the direction of flow of the flowing fluid medium. Mounted on the rotary crane is a forked crown. A swing carrier supporting the base is mounted in the forked crown. The base can be pivoted from the swing carrier in the forked crown, thereby varying the attitude of the base to match the flow speed of the fluid medium, so that during high speed conditions the apparatus can be throttled by tilting to maximize performance by varying the angle of incidence of the wind on the base.

In another embodiment there are solar cells installed on the turbine along with tracking control apparatus so as to optimize performance of the solar cells based on the position of the sun.

Another embodiment has an output shaft rotatably connected to the base cog wheel. The captured energy is transferred from the base cog wheel to the output shaft, from which the energy is eventually transferred to an external dynamo.

According to another embodiment of the invention, the turbine includes at least one cable that raises and lowers the turbine on the support.

According to yet another embodiment of the invention, an orbiting drum wind turbine for capturing energy from a flowing fluid medium has at least one belt guide rail mounted on the base. Further, the movable toothed belt has at least two tracks and at least one flat steel reinforcing band. At least one of the flat steel reinforcing bands has a steel reinforcement that sticks out from the belt edge and engages at least one belt guide rail.

According to another embodiment of the invention, a method of capturing energy from a moving fluid medium has the steps of locating at least one drum-shaped drive element in a moving fluid medium, and spinning the drive element about a central axis as it is urged by the impinging fluid medium along an orbiting course on a base. As the drive element moves along the orbiting course, it maintains an essentially constant angle between the drive element central axis and a horizontal plane. The method includes capturing energy from the impinging fluid medium by linking the motion of the drive elements to an external device.

Another embodiment of the invention includes adjusting the base's azimuth in response to wind direction.

Yet another embodiment of the invention includes adjusting the angle of incidence of the flowing fluid medium on the base in response to the flow speed of the fluid medium.

BRIEF DESCRIPTION OF THE DRAWINGS

FIG. 1c is a side view of the wind turbine with the side cover removed.

DETAILED DESCRIPTION OF THE PREFERRED EMBODIMENTS

The present invention will now be described in detail. The figures are illustrative examples of the invention presented to enable those skilled in the art to practice the invention. These figures and examples are not meant to limit the scope of the present invention to a single embodiment. Other embodiments can be implemented by interchanging some of the described or illustrated elements and by using equivalent structures.

First the linear motion of the drive elements will be described, followed by the means for guiding the drive elements in their courses as they travel around a continuous orbiting course. Then the means for spinning the drive elements will be discussed, followed by a discussion of the apparatus for transferring energy from the drive elements. Finally, additional features of the apparatus will be explained.

Figure 1A:
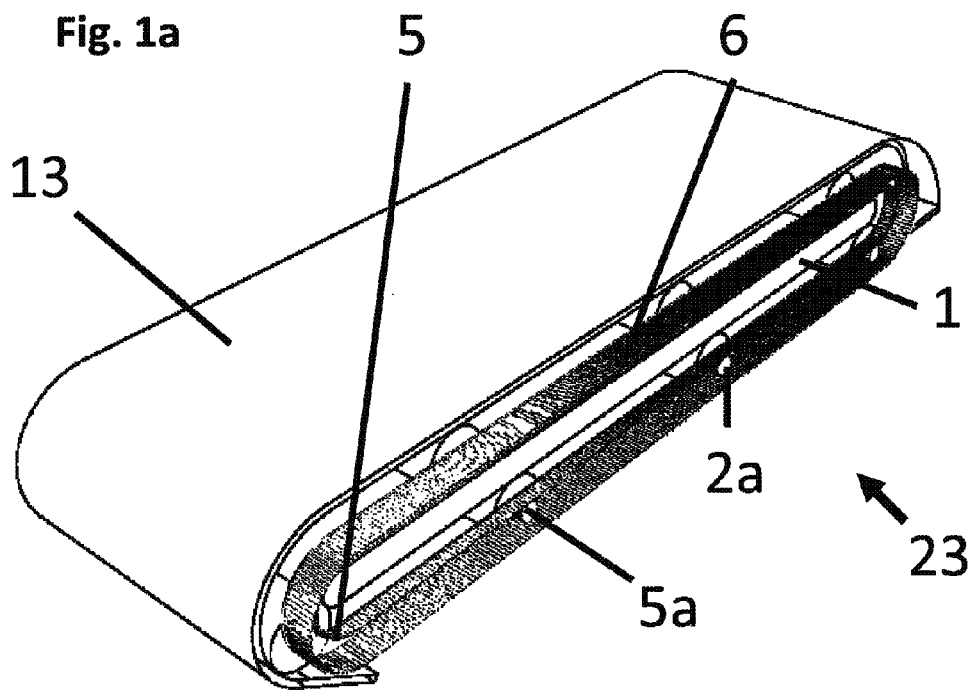
FIG. 1a is a partial perspective view of the wind turbine with the side cover removed.
Figure 1B:
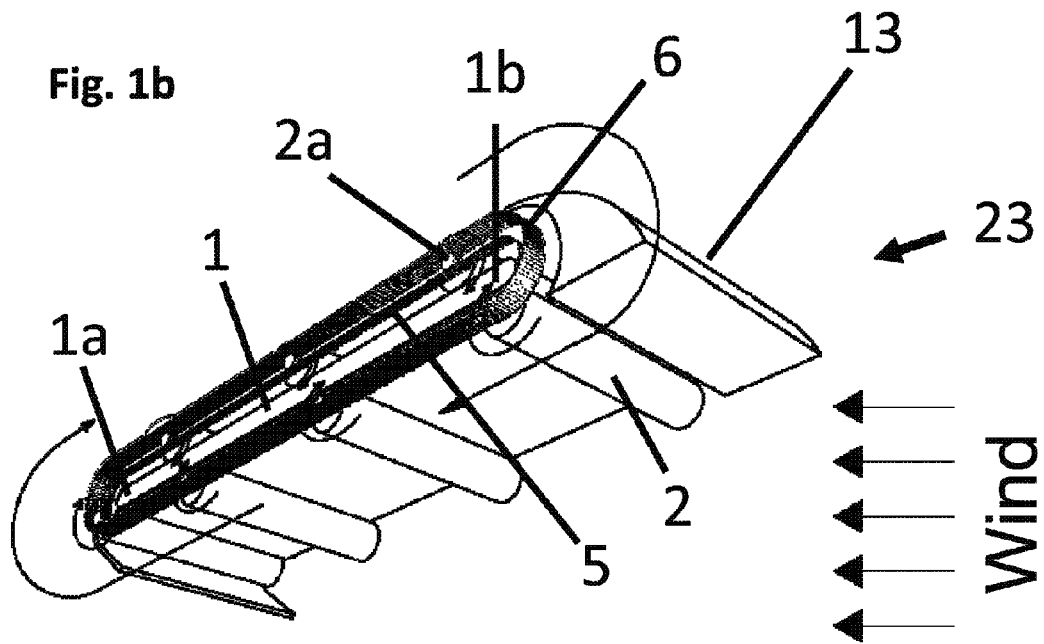
FIG. 1b is a partial perspective view of the wind turbine as viewed from the windward side with the side cover removed.

The linear motion of the drive elements according to one embodiment is illustrated in FIG. 1a and FIG. 1b, which show two partial perspective views of the wind turbine (23) without side covers. Only one end of each drum-shaped drive element (2) is shown. The fluid medium, wind in this case, blows on drive elements (2), creating impact pressure that urges the drive elements in a generally down-wind direction along the windward side of the base (1), somewhat linearly downward and from right to left in FIG. 1b. The drive elements (2) run before the wind, their central axes parallel to each other and parallel to the surface of the base (1) in an orbiting continuous orbiting course around the base (1). The drive elements are constrained to follow a continuous orbiting course down toward the lower edge (1a) of the base (1), around the lower edge (1a) of the base (1) and up the leeward side of the base (1). The drive elements move upward on their continuous orbiting course protected from the wind by the base (1). At the upper end of the continuous orbiting course, the drive elements are constrained to move around the upper edge (1b) of the base (1) and again descend toward the lower edge (1a) under the direct influence of the wind.

In an alternate embodiment, the drive elements run in an upward direction instead of the downward direction of FIG. 1b. In this alternate embodiment, the wind turbine base (1) is turned 180 degrees about a horizontal axis (e.g. about the swing carrier 12b shown in FIG. 8). While maintaining this new configuration, where the lower end (as seen in FIG. 1b) of the turbine base (1) is lifted and the upper end (as shown in FIG. 1b) is lowered, the turbine (23) is again positioned so that the drive elements face into the wind. The drive elements in this alternate embodiment will then run upward, rather than in the downward direction of FIG. 1b. In embodiments using downward running drive elements, the system is better protected against heavy weather and ice buildup.

Referring again to the embodiment of FIG. 1a and FIG. 1b, a weather shield (13) covers part of the outside of the turbine (23) (the leeward side of the base (1)) and protects the interior parts from rain and other exposure hazards. Multiple drive elements (2) have drive element shafts (2a) that lie along the central axes of the drive elements, with drive element wheels, in this embodiment the drive element wheels are drive element cog wheels (5a) mounted on the drive element shafts (2a). The drive element cog wheels (5a) engage a movable flexible drive member which in this embodiment is the movable toothed belt (6) and a stationary drive surface which in this embodiment is the stationary toothed belt (5). The movable toothed belt (6) as well as the drive elements (2) are shown moving around a base (1). A second set of drive element shafts, drive element cog wheels and a second movable toothed belt associated with the other end of the drive elements in this embodiment are not shown in FIG. 1a and FIG. 1b.

Referring now to FIG. 1c, the continuous orbiting course of the drive elements is shown in a side view of one embodiment of the invention. The side cover has been removed in this view. The orbiting drum wind turbine (23) is shown with a base (1) which is positioned at an angle to the horizontal plane. The figure also shows the windward side of the base, the leeward side of the base, the lower edge (1a) of the base (1), and the upper edge (1b) of the base (1). Also shown in FIG. 1c are drive elements (2), drive element shafts (2a), a stationary toothed belt (5), drive element cog wheels (5a), a movable toothed belt (6), an energy output element which in this embodiment is an output shaft (6b), a weather shield (13), solar power cells and tracking control (16) and a power link (15) from the output shaft to an external dynamo (17).

Figure 2:
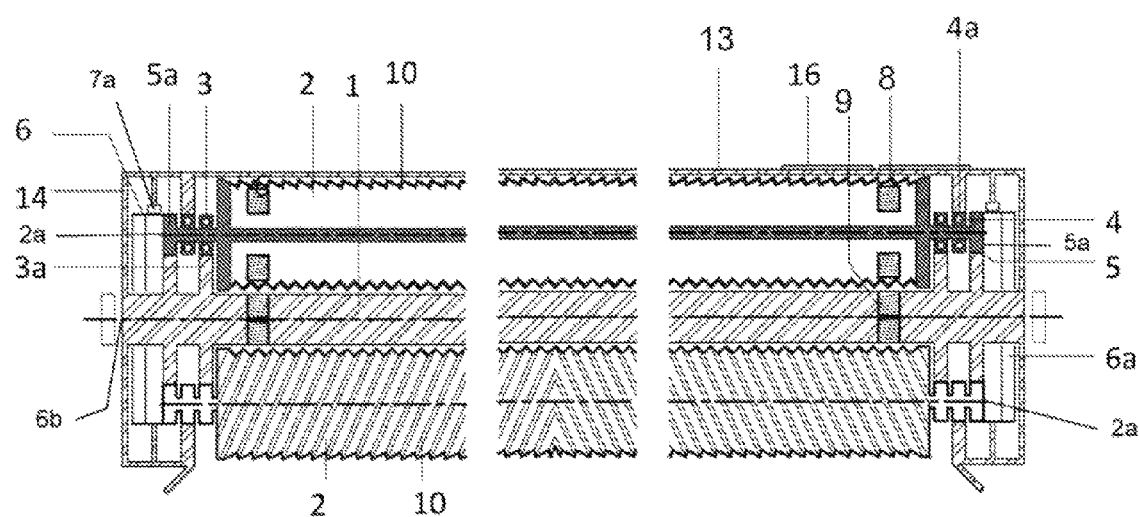
FIG. 2 shows section 1-1 from FIG. 1c, including the integrated dynamo.

The means for guiding the drive elements in the orbiting course according to one embodiment are shown in FIG. 2, which shows a section from FIG. 1c taken through the central axis of a drive element in the wind turbine (23). As shown in FIG. 2, each drive element (2) has a drive element shaft (2a) lying along the central axis of a drive element and extending from each end of the drive element. Onto each shaft are attached inner roller bearings (3) and outer roller bearings (4). The inner roller bearings (3) run in inner roller bearing raceways (3a) mounted on the base (1); the outer roller bearings run in outer roller bearing raceways (4a) mounted on the side cover (14). In one embodiment, in order to limit the lateral clearance of the drive elements, at least one of the roller bearing raceways is beveled. The respective roller bearings are matched to the bevel profile. It can be seen by one skilled in the art that other ways of practicing the present invention can involve means for guiding the drive elements in their courses other than bearings or raceways. Many methods for forcing a moving object to follow a fixed path exist. For example, wheels, channels, cables or sliding parts could be used.

Also shown in FIG. 2 are: the base (1), the stationary drive surface which in this embodiment is a stationary toothed belt (5), the drive element wheel which in this embodiment is the drive element cog wheel (5a), the movable flexible drive member which in this embodiment is the movable toothed belt (6), the base drive wheel which in this embodiment is a base cog wheel (6a), the armature winding (8), the stator winding (9), the spiral-shaped corrugation (10), the weather shield (13) and the solar power cell tracking automation and operational control with the solar power cells (16).

Figure 3:
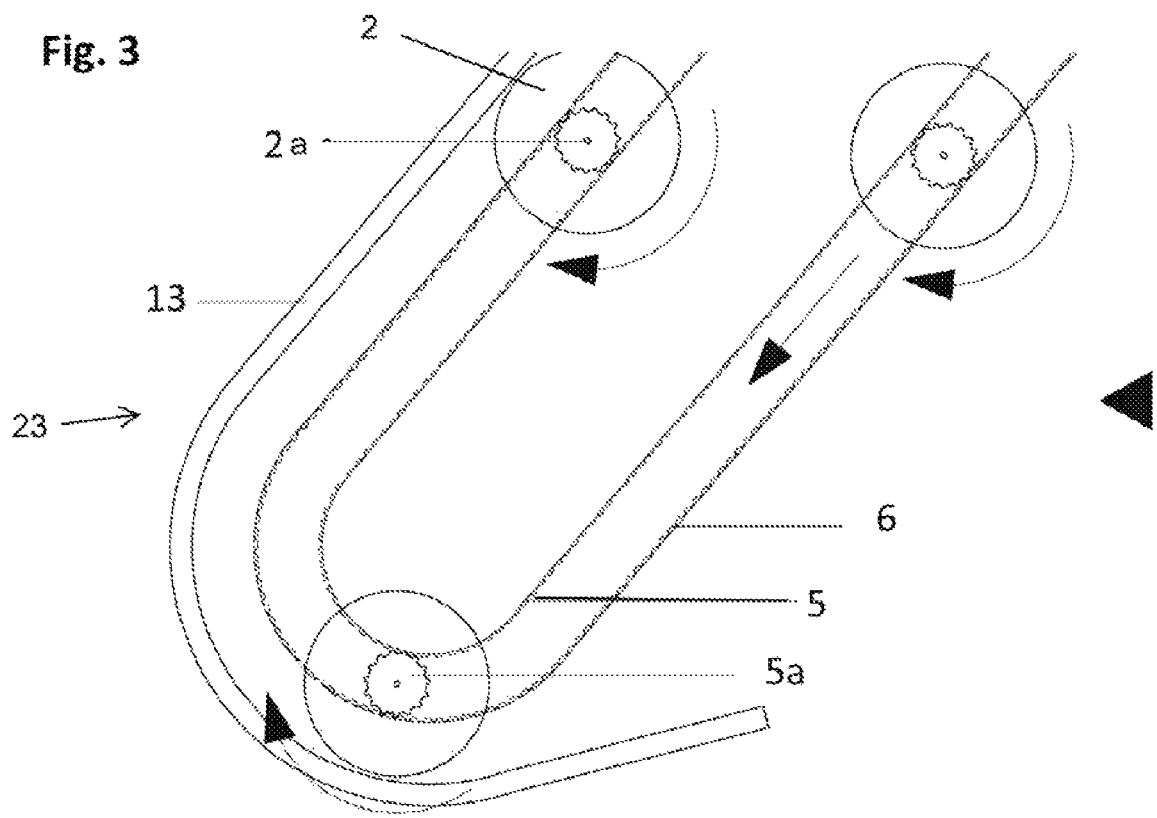
FIG. 3 shows detail of a side view of the wind turbine.
Figure 10:
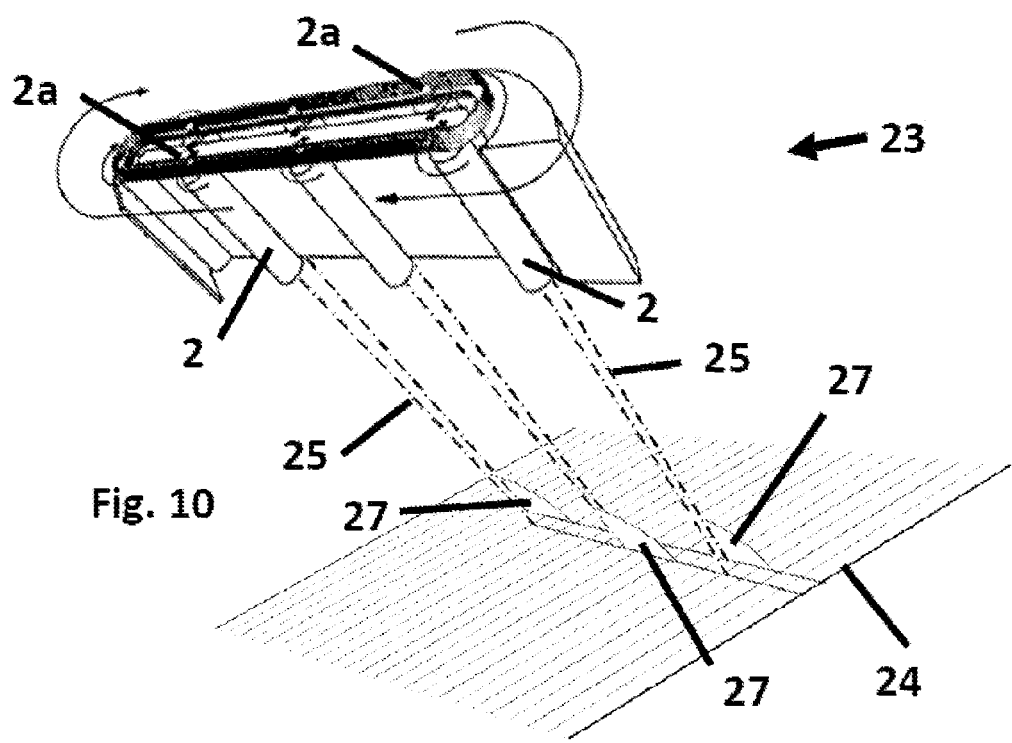
FIG. 10 is a partial perspective view of the wind turbine as viewed from the windward side with the side cover removed as shown in FIG. 1b. Additionally, drive element central axes and a horizontal plane are shown.

The means for spinning the drive elements includes a drive element wheel mounted on the drive element and a stationary drive surface that engages the wheel. The means used in one embodiment can be seen in FIG. 3, which is detail of a side view of the wind turbine (23) shown in FIG. 1c. The drive element wheels in this embodiment are drive element cog wheels (5a) attached on each end of the drive element shafts (2a) in a fixed manner. The stationary drive surface in this embodiment is a stationary toothed belt (5) attached to the base (1). The stationary toothed belt (5) engages the drive element cog wheels (5a). In another embodiment, a stationary toothed rack can be used in place of the stationary toothed belt (5). In yet another embodiment a roller chain or a double roller chain can be used in place of the stationary toothed belt (5). The engagement of the drive element cog wheels (5a) into the stationary toothed drive belt (5) causes the drive elements (2) to spin as the wind forces the drive elements to move past the stationary drive surface downward along the continuous orbiting course. The drive element cog wheels (5a) maintain engagement with the stationary toothed drive belt as the drive elements move along their continuous orbiting course. The drive elements move while rotating, and will always run parallel to each other and with essentially the same angle between the drive element central axis and an intersecting horizontal plane. The angular relationship between the drive element central axes (25) and a horizontal plane (24) can be seen in FIG. 10. FIG. 10 shows the wind turbine (23), the drive element (2), and the drive element shaft (2a). FIG. 10 is essentially the same as FIG. 1b, except that FIG. 10 additionally shows the drive element central axis (25) intersecting a horizontal plane (24), thereby forming an angle (27) with that plane. Since the direction of the drive element central axis (25) at any time remains essentially parallel to the direction of that axis at any other time, as the drive element is guided in a continuous orbiting course around the base the axis (25) always intersects the horizontal plane (24) at the same angle (27). It can be seen by one skilled in the art that other ways of practicing the present invention can involve means other than gears and teeth for spinning the drive elements in their courses. Many methods for forcing a moving object to spin exist. Some examples, not intended to be limiting, are presented below. Wind vanes could be used to impart torque, as could small motors. Furthermore, in place of a gear wheel and toothed belt a smooth wheel could engage a stationary surface using only frictional forces to make the wheel turn as it rolls along the surface. Also shown in FIG. 3 are the movable toothed belt (6) and the weather shield (13).

The means for spinning the drive elements includes a drive element wheel mounted on the drive element and a stationary drive surface that engages the wheel. The means used in one embodiment can be seen in FIG. 3, which is detail of a side view of the wind turbine (23) shown in FIG. 1c. The drive element wheels in this embodiment are drive element cog wheels (5a) attached on each end of the drive element shafts (2a) in a fixed manner. The stationary drive surface in this embodiment is a stationary toothed belt (5) attached to the base (1). The stationary toothed belt (5) engages the drive element cog wheels (5a). In another embodiment, a stationary toothed rack can be used in place of the stationary toothed belt (5). In yet another embodiment a roller chain or a double roller chain can be used in place of the stationary toothed belt (5). The engagement of the drive element cog wheels (5a) into the stationary toothed drive belt (5) causes the drive elements (2) to spin as the wind forces the drive elements to move past the stationary drive surface downward along the continuous orbiting course. The drive element cog wheels (5a) maintain engagement with the stationary toothed drive belt as the drive elements move along their continuous orbiting course. The drive elements move while rotating, and will always run parallel to each other and with essentially the same angle between the drive element central axis and an intersecting horizontal plane. It can be seen by one skilled in the art that other ways of practicing the present invention can involve means other than gears and teeth for spinning the drive elements in their courses. Many methods for forcing a moving object to spin exist. Some examples, not intended to be limiting, are presented below. Wind vanes could be used to impart torque, as could small motors. Furthermore, in place of a gear wheel and toothed belt a smooth wheel could engage a stationary surface using only frictional forces to make the wheel turn as it rolls along the surface. Also shown in FIG. 3 are the movable toothed belt (6) and the weather shield (13).

Figure 4:
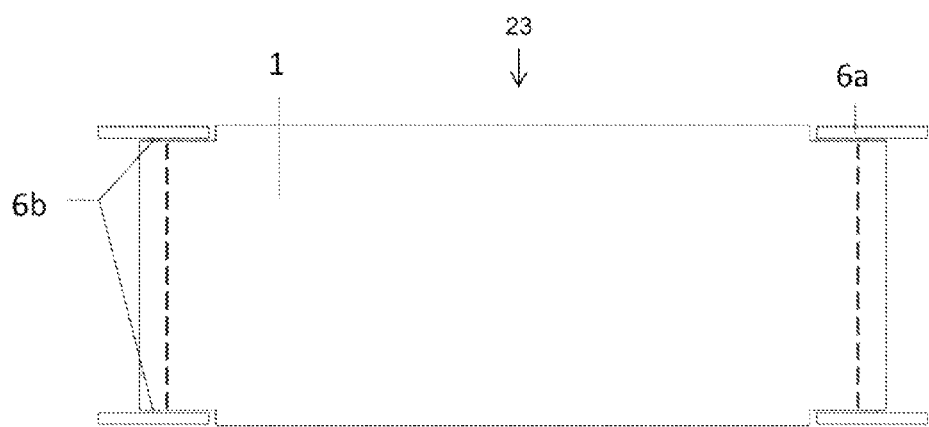
FIG. 4 is a planar top view of the wind turbine.
Figure 5:
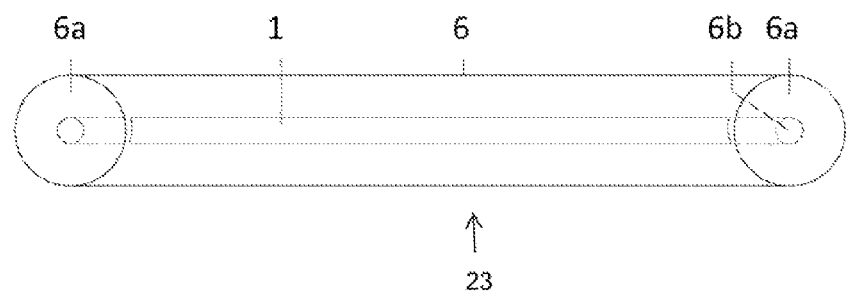
FIG. 5 is the side view of the wind turbine from FIG. 4.

The apparatus for transferring energy from the drive elements, according to one embodiment, as seen in FIG. 1c, includes a movable toothed belt (6) with two toothed tracks. Each of the drive element cog wheels (5a) engages the stationary toothed drive belt (5) on one side of the cog wheel and one track of the movable toothed belt (6) on the other side of the same cog wheel. Thus, when a drive element (2) moves along the continuous orbiting course, engagement with the stationary toothed belt (5) causes the drive element to spin, and engagement with the movable toothed belt (6) causes the movable toothed belt to advance with the drive element along the continuous orbiting course. Since other drive elements are also engaged with the movable toothed belt, those drive elements on the lee side of the apparatus are also spun and brought along on the continuous orbiting course by the moving toothed belt. The movable toothed belt (6) has two toothed tracks. One track engages the drive element cog wheels (5a), while the other track engages one of four base cog wheels (6a) which are mounted to the base (1), as shown in FIG. 4 and FIG. 5. When the drive elements (2) of the wind turbine (23) are impinged by the wind, the wind energy is transferred first to the drive elements (2), then to the movable toothed belt (6), next to the base cog wheels (6a) and finally via an output shaft (6b) via any necessary linkage to an external dynamo (17). It can be seen by one skilled in the art that other ways of practicing the present invention can involve means other than cog wheels and toothed belts. For example, instead of the toothed belts, roller chains and double roller chains can be used for transferring wind energy from moving drive elements to a dynamo, as well as for the role of stationary drive surface. Also, the energy from the drive elements can be transferred to energy-consuming equipment other than dynamos, such a pumps.

Figure 7:
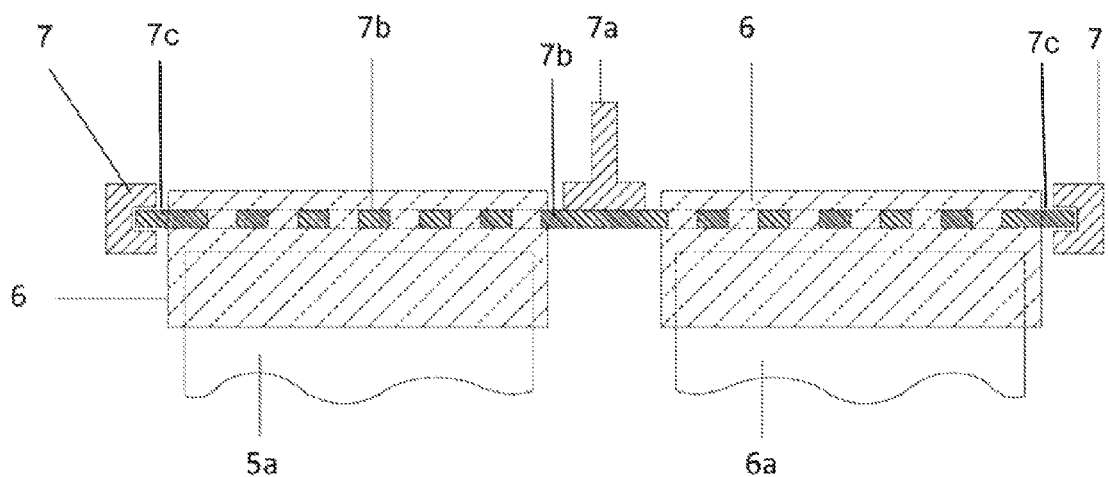
FIG. 7 shows a cross section of the movable toothed belt.

Referring next to FIG. 7, in one embodiment, the movable toothed belt (6) with two tracks is shown. The view is a cross section of the belt taken perpendicular to the longitudinal direction of movement of the belt. The belt engages the drive element cog wheel (5a) with one of the two tracks and the base cog wheel (6a) with the other track. The movable toothed belt (6) is reinforced with at least one flat steel reinforcement band (7b) that extends longitudinally in the belt. A flat steel reinforcement extension (7c) that sticks out of the belt edge on both sides and engages in the belt guide rails (7). In the center a flat steel reinforcement band (7b) lies uncovered. A sliding shoe (7a) presses on this uncovered surface and holds the toothed belt against the cog wheels. The belt guide rails and the outer roller bearing raceway are mounted to the side cover and to the housing. The belt guide rails are lubricated via a central oil supply.

Figure 8:
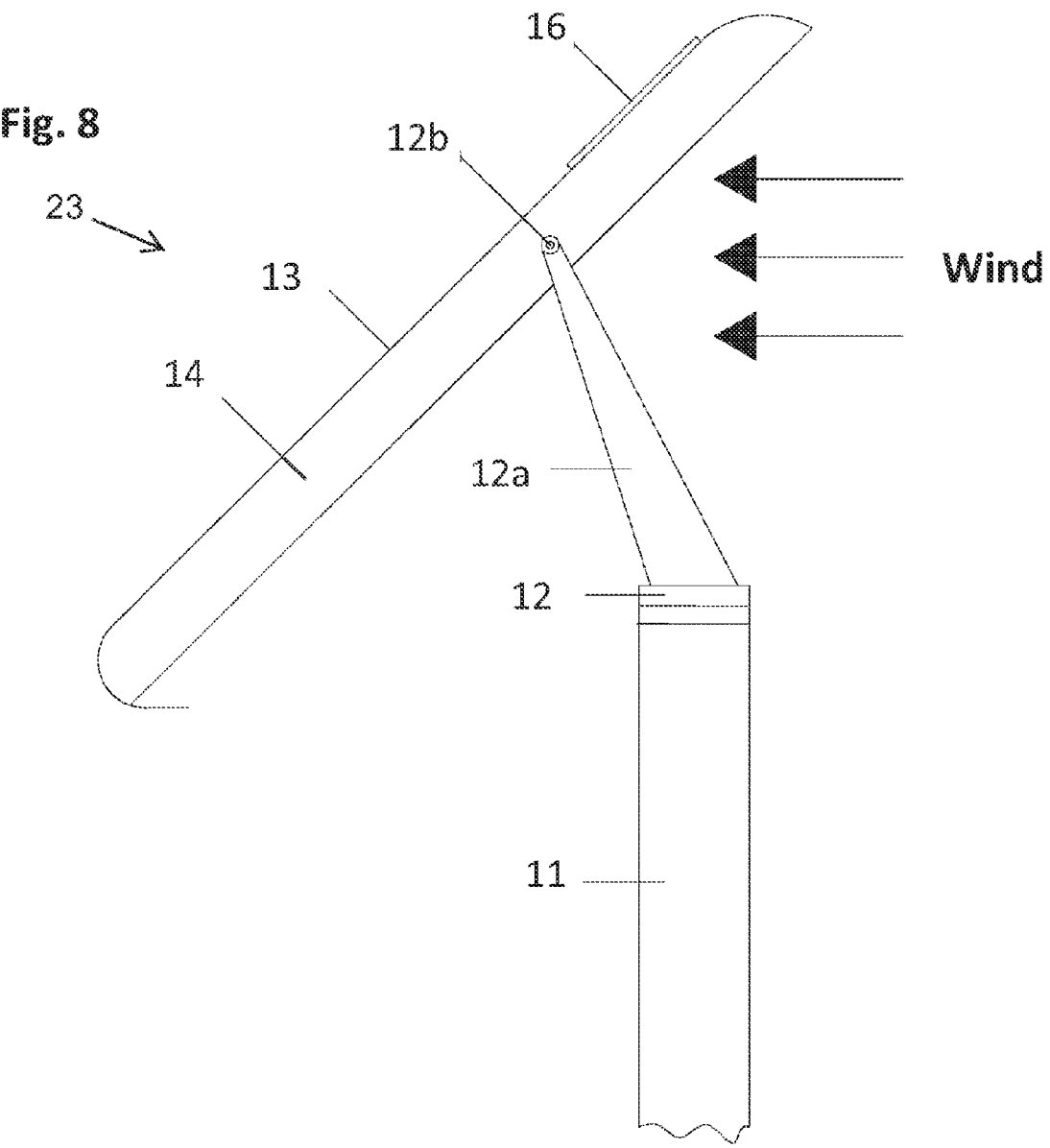
FIG. 8 is a side view of the wind turbine in operation with its supporting mast.

Referring now to FIG. 8, a rotary crane (12) for supporting the wind turbine (23) is shown on top of a support (11) on a mast. The rotary crane (12) rotates to position the turbine (23) at an azimuth that will maximize the effect of the flowing fluid medium on the turbine. That is the azimuth at which the base (1) is positioned so that the direction of the flowing fluid medium is approximately perpendicular to the drive element shafts. FIG. 8 also shows the weather shield (13), the side cover (14) and the solar power cell tracking automation and operational control and the solar power cells (16).

A forked crown (12a) is shown mounted on the rotary crane (12) in FIG. 8. The forked crown (12a) supports the swing carrier (12b), which in turn permits changing the vertical angle of the base (1). In one embodiment the wind turbine (23) can be tilted by electronic control. A stepper motor changes the vertical angle that the base (1) makes with the direction of the flowing fluid medium such as wind in response to changes in flow speed. This enables matching the configuration of the apparatus to changing flow speed. The plane of the base (1) can be adjusted from nearly vertical for use with low flow speeds to nearly horizontal for use with higher flow speeds. With the wind turbine base positioned horizontally, the system can be completely switched off and offer the least contact surface to the flowing medium. However, even during periods of high flow speeds, the system does not have to be switched off.

During times when the system is shut down, the base plate can be brought to a level position and thus presents the smallest working surface to the flowing fluid medium.

In one embodiment the solar power cell tracking automation and operational control with the solar power cells (16) are mounted on the weather shield (13). The electronically operated wind adjustment control can, during a calm, be used to adjust the turbine's position, thereby creating the optimal angle toward the sun to maximize the performance of the solar power cells.

A lightning rod mounted on the weather protection side cover, the highest-positioned part of the system, provides protection for the drive elements and the electronics against lightning strikes.

Figure 9:
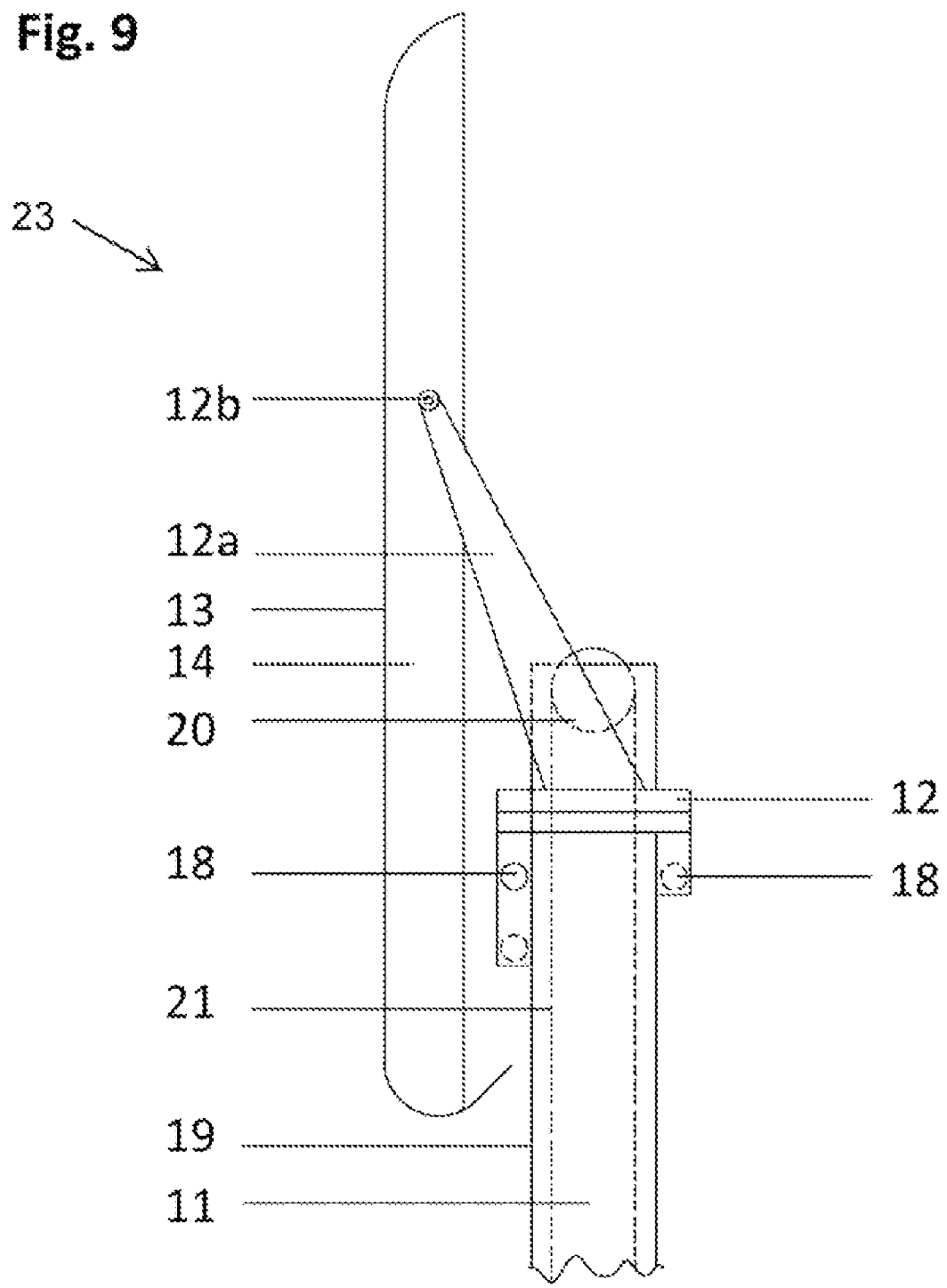
FIG. 9 is a side view of the wind turbine with its supporting mast.

Referring to FIG. 9, the support (11) located on top of a mast is equipped with a rotary crane (12) supporting the forked crown (12a). The forked crown (12a) is mounted at an angle to the mast axis so that the forked crown top extends out beyond the side of the support (11). As a consequence, as shown in FIG. 9, the wind turbine and accompanying positioning apparatus can be lifted up or down using cables (21) that run over return pulleys (20). The apparatus moves up and down on track rollers (18) that move on track rails (19). This way, the high costs that arise from the use of big cranes can be saved when it comes to maintenance performed at ground level. The cables can be equipped with counterbalance weights. This reduces the amount of electromotive power that is necessary to move the apparatus up and down.

Figure 6:
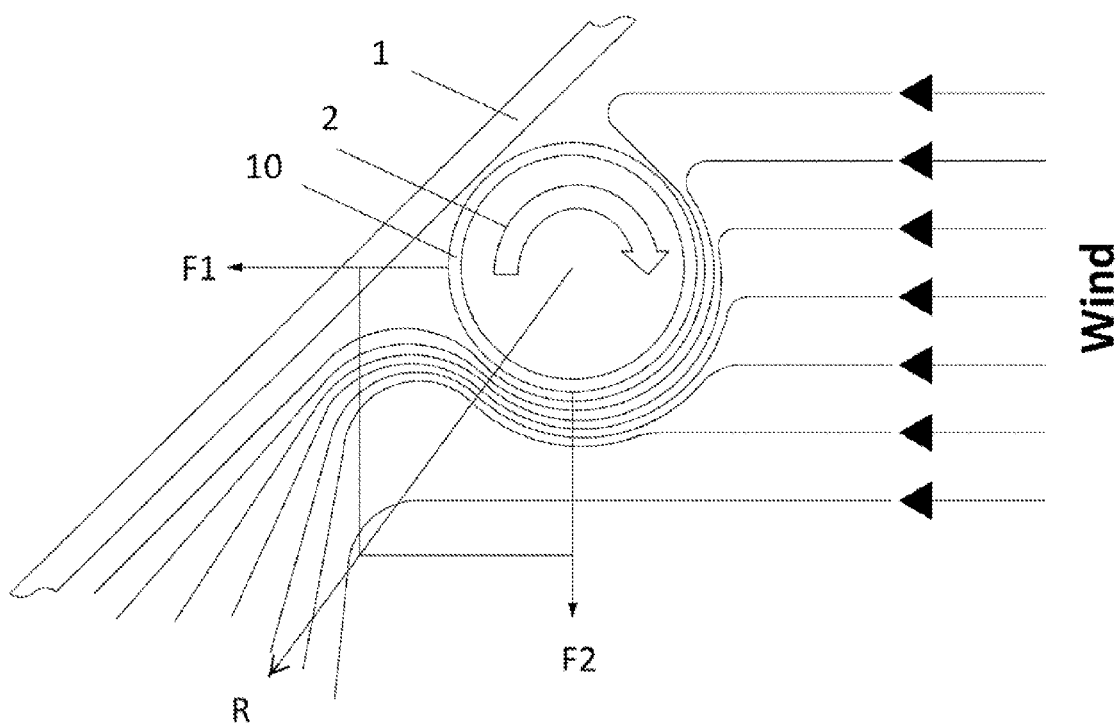
FIG. 6 is a diagram illustrating the Magnus-Effect.

The Magnus Effect as it applies to the current invention is illustrated in FIG. 6. Simply put, when a moving fluid such as wind impinges on a drive element (2), simple impact pressure results in an impact direction force F1. If the drive element is spinning, the fluid at the surface of the spinning drive element also rotates. When the impinging fluid reaches the rotating fluid at the surface of the drive element, if the direction of the impinging fluid opposes the direction of the rotating fluid (as is the case at the top of the drive element in FIG. 6), the fluid pressure at that location increases. If the direction of the impinging fluid coincides with the direction of the moving fluid (as is the case at the bottom of the drive element in FIG. 6), the fluid pressure decreases. This pressure differential creates a Magnus direction force F2 perpendicular to the direction of the wind. As shown in FIG. 6, for example, if components F1 and F2 are equal, the resultant force R will be approximately parallel to base 1 and will urge the drive element along its course parallel to the base (1). A spiral-shaped corrugation (10) can be placed on the surface of the drive element to enhance the contact of the spinning drive element with the surrounding fluid.

In the case of the present invention, the Magnus Effect can enhance efficiency without an using an electric motor to rotate the drive elements. The drive elements of the present invention are forced to rotate in order to move along the continuous orbiting course. The impinging fluid thus serves both to move the drive elements linearly using impact pressure and also, by forcing the drive elements to rotate, serves to move the drive elements linearly by virtue of the Magnus Effect. The energy conversion efficiency of the Magnus Effect is influenced by additional parameters including the size of the drive elements, the size of the drive element cog wheels (5a), and by the spinning speed of the drive elements (2). Generally, the faster the drive elements spin, the greater will be the Magnus Effect.

According to another embodiment, the configuration of FIG. 1c is changed. The flexible drive member (the movable toothed belt (6) in FIG. 1c) is now held stationary and the stationary drive surface (the stationary toothed belt (5) in FIG. 1c) moves. This switches the direction of spin of the drive elements as they travel along the continuous orbiting course. In contrast to the embodiment of FIG. 1c, where the drive elements spin in the direction of their linear travel along the continuous orbiting course, the spin of the drive elements is now in a direction opposite to the direction of their linear travel. The base cog wheels engage what has become the new movable toothed belt.

According to a further embodiment, an orbiting drum wind turbine and method for the generation of electrical power from wind energy includes drive elements (2), which are impinged by wind and guided around a base plate (1) in a continuous orbiting course by inner roller bearings (3), which run along an inner roller bearing raceway (3a), and outer roller bearings (4) which run along the outer roller bearing raceway (4a). Mounted to the end of the drive element shaft (2a) in a fixed manner are the drive element cog wheels (5a) that engage into the stationary toothed belt (5) on one side of the drive element cog wheels. The drive elements are guided parallel and at an equal distance to each other in the continuous orbiting course. The stationary toothed belt (5) provides an opposing surface for the drive element cog wheels (5a) that engage the movable toothed belt (6) on the opposite side. The movable toothed belt (6) with the two tracks takes the kinetic energy from the drive elements (2) with one of the belt's two tracks, and transfers it to the base cog wheels (6a) with the belt's other track. The base cog wheels (6a) transfer the power to an output shaft (6b), and from there to an external dynamo (17). In one embodiment the dynamo is located internally, with the stator windings (9) assembled to the base plate, and the armature windings (8) assembled to the drive elements (2) in a way that, during orbiting, voltage is generated.

The invention includes a method of capturing energy from a moving fluid medium. One step is to locate at least one drum-shaped drive element in a moving fluid medium such as wind or flowing water, and spinning the drive element or elements about a central axis as the impinging fluid medium pushes the drive element along an orbiting course around a base. As the drive element moves along the orbiting course, it maintains an essentially constant angle between the drive element central axis and a horizontal plane. This means that the drive elements are not arranged like spokes in a wheel. The method includes capturing energy from the impinging fluid medium by linking the motion of the drive elements to an external device. In order to have the flowing medium impinge the drive elements directly in the most efficient manner, the turbine is rotated so as to have the exposed side of the device with the drive elements exposed face into the flowing fluid medium. This change in azimuth is one of the steps in the method of operating the invention. In addition, the angle of incidence of the flowing fluid medium on the base is adjusted in response to the flow speed of the fluid medium. This permits the invention to accommodate both low and high flow speeds in the flowing fluid medium.

What is claimed is:

1. An orbiting drum turbine for capturing energy from a flowing fluid medium such as wind or water, comprising:
   (a) a base,
   (b) a plurality of flow-driven, drum-shaped drive elements each drive element having a central axis, said axes remaining essentially mutually parallel while said drive elements are guided around the base in a continuous orbiting course, thereby transferring energy to an energy output element,
   (c) means connected to said base for guiding the drive elements in the continuous orbiting course so that the drive elements follow the continuous orbiting course when a flowing fluid medium impinges on the drive elements, and
   (d) means at least partly mounted on the base for spinning the drive elements as they follow the continuous orbiting course, such that the drive elements can engage in motion comprising simultaneously spinning and travelling along the continuous orbiting course.

2. The turbine of claim 1, further comprising:
   (a) a stator winding mounted on the base, and
   (b) an armature winding on the drive element, positioned so as to induce an electric current by the motion of the drive element.

3. The turbine of claim 1, wherein the means for guiding the drive elements in the continuous orbiting course comprises:
   (a) at least one roller bearing attached to the drive element, and
   (b) at least one bearing raceway on the base;
   and wherein the roller bearing engages the raceway, thereby guiding the drive element along the continuous orbiting course around the base.

4. The turbine of claim 1, wherein the means for spinning the drive elements as they follow the continuous orbiting course comprises:
   (a) at least one movable flexible drive member,
   (b) at least one drive element wheel mounted on the drive element and engaging the movable flexible drive member and transferring energy from the drive element to the flexible drive member, and
   (c) a stationary drive surface mounted on the base and in contact with the drive element wheel, the stationary drive surface designed to grip the surface of the drive element wheel, permitting the drive element wheel to roll along over the stationary drive surface but designed to prevent the drive element wheel from slipping on the stationary drive surface.

5. The turbine of claim 4, wherein the movable flexible drive member comprises a toothed belt and the drive element wheel comprises a drive element cog wheel.

6. The turbine of claim 4, further comprising at least one base drive wheel rotatably supported by the base, engaging the movable flexible drive member and receiving energy from the movable flexible drive member.

7. The turbine of claim 6, wherein the energy output element comprises an output shaft rotatably connected to the base drive wheel and wherein the energy received by the base drive wheel is transferred to the output shaft and eventually to an external dynamo.

8. The turbine of claim 1, wherein the drive element further comprises a reinforcing spiral-shaped corrugated outer layer.

9. The turbine of claim 1, further comprising:
   (a) a support,
   (b) a rotary crane mounted on the support for following the direction of flow of the fluid medium,
   (c) a forked crown mounted on the rotary crane, and
   (d) a swing carrier mounted in the forked crown and supporting the base;
   wherein the base can be pivoted from the swing carrier in the forked crown, thereby varying the attitude of the base to match the flow speed of the fluid medium, so that during high speed conditions the apparatus can be throttled by tilting to maximize performance by varying the angle of incidence of the fluid medium on the base.

10. The turbine of claim 1, further comprising:
    (a) solar power cells installed on the turbine, and
    (b) tracking automation and operational control that serve, during a calm, to position the turbine so as to optimize performance of the solar power cells based on the position of the sun.

11. The turbine of claim 9, wherein the turbine support is located on a mast and the turbine can be raised and lowered on the support mast using at least one cable.

12. An orbiting drum turbine for capturing energy from a flowing fluid medium such as wind or water comprising:
    (a) a base,
    (b) at least one drum-shaped drive element having a central axis,
    (c) at least one roller bearing attached to an end of the drive element,
    (d) at least one raceway on the base, the roller bearing engaging the raceway, the bearing and raceway serving to guide the drive element in a continuous orbiting course around the base while maintaining essentially the same angle between the drive element central axis and an intersecting horizontal plane,
    (e) means for spinning the drive element about its central axis as it follows the continuous orbiting course, the means comprising:
        (i) at least one movable toothed belt,
        (ii) at least one drive element cog wheel mounted on an end of the drive element and engaging the movable toothed belt, and
        (iii) at least one stationary drive surface mounted on the base and in contact with the drive element cog wheel, the stationary drive surface designed to grip the drive element cog wheel, permitting the drive element cog wheel to roll along over the stationary drive surface but designed to prevent the drive element cog wheel from slipping on the stationary drive surface, (f) at least one base cog wheel rotatably supported by the base, engaging the movable toothed belt and receiving mechanical energy from the movable toothed belt;

wherein the turbine is configured so that when a flowing fluid medium impinges on the drive element, the drive element engages in motion comprising simultaneously spinning and travelling along the continuous orbiting course, the turbine being configured such that said motion captures energy from the impinging fluid medium and transfers the energy to at least one base cog wheel via the movable toothed belt.

13. The turbine of claim 12, further comprising:
(a) a support,
(b) a rotary crane mounted on the support for following the direction of flow of the fluid medium,
(c) a forked crown mounted on the rotary crane, and
(d) a swing carrier mounted in the forked crown and supporting the base;

wherein the base can be pivoted from the swing carrier in the forked crown, thereby varying the attitude of the base to match the flow speed of the fluid medium, so that during high speed conditions the apparatus can be throttled by tilting to maximize performance by varying the angle of incidence of the fluid medium on the base.

14. The turbine of claim 12, further comprising:
(a) solar power cells installed on the turbine,
(b) tracking control that serves, during a calm, to position the turbine so as to optimize performance of the cells based on the position of the sun.

15. The turbine of claim 12 further comprising an output shaft rotatably connected to the base cog wheel, wherein the captured energy is transferred from the base cog wheel to the output shaft from which the energy is eventually transferred to an external dynamo.

16. The turbine of claim 12 further comprising at least one cable, wherein the turbine can be raised and lowered on a support mast using the cable.

17. The turbine of claim 12,
(a) wherein the turbine comprises at least one belt guide rail mounted on the base, and
(b) wherein the movable toothed belt comprises:
(i) at least two tracks
(ii) at least one flat steel reinforcing band,
(iii) a flat steel reinforcement extension that sticks out from the belt edge and engages at least one belt guide rail.

18. A method of capturing energy from a moving fluid medium comprising:
(a) locating a plurality of drum-shaped drive elements in a moving fluid medium, each drive element having a central axis, said central axes being essentially mutually parallel,
(b) spinning the drive elements about their central axes as they are urged by the impinging moving fluid medium along a continuous orbiting course around a base, and
(c) capturing energy from the impinging fluid medium by linking the motion of the drive elements to an external device.

19. The method of claim 18 further comprising adjusting the base's azimuth in response to wind direction.

20. The method of claim 18 further comprising adjusting the angle of incidence of the flowing fluid medium on the base in response to the flow speed of the fluid medium.

21. The turbine of claim 1, wherein the means for spinning the drive elements as they follow the continuous orbiting course comprises:
(a) at least one first moveable flexible drive member;
(b) at least one drive element wheel mounted on the drive element and engaging the first moveable flexible drive member and transferring energy from the drive element to the first moveable flexible drive member;
(c) at least one second moveable flexible drive member moveably mounted on the base and in contact with the drive element wheel, capable of affecting the spin of the drive elements and capable of switching the direction of spin of the drive elements as they travel along the continuously orbiting course.

* * * * *